Patented Jan. 2, 1940

2,185,861

UNITED STATES PATENT OFFICE 2,185,861

CONTROL SYSTEM

Jacob W. McNairy, Erie, Pa., assignor to General Electric Company, a corporation of New York Application December 30, 1938, Serial No. 248,495

19 Claims. (Cl. 172—179)

My invention relates to control systems for electric vehicles such as electric railway cars, elevators and the like, particularly to dynamic braking motor control systems, and has for its object a simple and reliable system giving quick braking response.

More particularly, my invention is an improvement of the control system described and claimed in my Patent No. 2,120,954, issued June 14, 1938.

In the control system of my aforesaid patent, all of the accelerating resistance is inserted in the motor circuit whenever motoring connections are established. This means that when braking is established after motoring operation for a short time only in which the resistance is not cut out of the circuit, this resistance will be in the circuit for the coasting or braking operation and, in some cases, may be so great as to prevent immediate build-up of the motors as generators.

It will be understood that in systems of this type, when the acceleration controller is thrown off after the motoring operation, but the braking controller not thereafter operated for braking operation, a spotting circuit through the braking resistance is established automatically for the coasting operation. At that time, the motors are caused to build up as generators with weak fields and the resistance is adjusted automatically in accordance with the speed of the vehicle, or motoring speed, for the quick application of dynamic braking in the event that it is needed. However, if coasting follows a short motoring operation, the resistance in the circuit may be too great for the motor to build up as a generator with weakened field during coasting. This requires operation of the control to reduce the resistance with the resulting delay in establishing the voltage and braking resistance conditions for dynamic braking.

Furthermore, over-shooting results because of the hysteresis in the magnetic circuits of the motor and also because of the time lag in the build-up of the motors as generators resulting from the inductance of the field windings. For these reasons, when the dynamic braking conditions are established by reducing the resistance, a lower value of resistance is required to establish a given coasting current than would be required if the conditions were established by reducing the fields of the motor.

In accordance with my invention, I initiate the coasting operation with full-field excitation and after the current is built up to a predetermined value, decrease the field excitation and adjust the dynamic braking resistance to maintain a predetermined current.

For a more complete understanding of my invention, reference should be had to the accompanying drawings, Fig. 1 of which is a simplified diagram of a system of traction motor control embodying my invention; Fig. 6 is a diagram similar to Fig. 1 showing a modified form of my invention, while

Referring to the drawings, I have shown my invention in one form as applied to a control system such as described and claimed in my aforesaid patent, No. 2,120,954. As shown, the control is applied to four traction motors 10 to 13 inclusive which are provided with field windings 14 to 17 respectively. The motors are direct current motors and the field windings are of the series excited type. By means of a suitable manually operated controller (not shown) provided with reversing switches 8 and 9, the connections in the field windings of the motor circuits may be reversed as desired to get the desired direction of operation of the motors.

Figure 2:
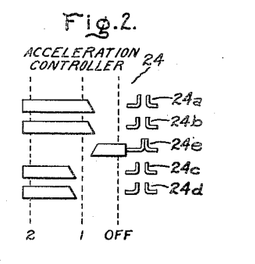
Fig. 2 is a lay-out view of the acceleration controller.
Figure 3:
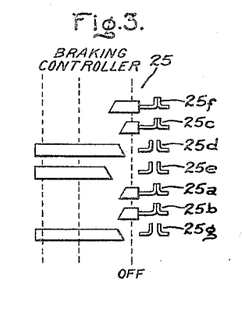
Fig. 3, a view of the braking controller.

Other devices incorporated in this control system comprise a plurality of motor controller resistors 18 to 21 for controlling the acceleration and dynamic braking of the motors, field shunting resistors 22 and 23, an acceleration controller 24 (Fig. 2) and a braking controller 25 (Fig. 3).

For driving a resistance varying contact device 26 for the resistor 19, I have provided an air pressure operated, fluid device 27 which is similar to the device 24 of my aforesaid patent. Also driven by the device 27 is an auxiliary controller 28 shown in Fig. 4.

With the manually operated controllers 24 and 25 turned to their off positions, the air pressure operated device 27 actuates the contact device 26 to the position $a$ as shown in which all of the resistance 19 is included in the motor circuit. Assuming that the motor is to be started, the controller 24, Fig. 2, is turned to its first position whereby the switches 24a and 24b are closed and the switch 24e opened. The switch 24a establishes a circuit for energization of the LB1 coil which operates to close the LB1 contactor. This circuit leads from the plus supply wire or trolley 29 through the switch 25a on the braking controller which is closed, switch 24a, interlock switch 30, the LB1 coil, and interlock switch 31 which is closed to the ground wire 32. When the LB1 switch is closed, its interlock switch 34 closes thereby closing a holding circuit for the LB1 coil.

The 24b switch closes the circuit for the LB2 coil whereby the LB2 switch is closed. This circuit leads through the 25b switch on the braking controller.

The LB1 and LB2 switches close the motor circuit through the two pairs of motors in parallel with each other, the resistance 20, the resistance 19 and the current coil 35 to ground. The motors now start with full field excitation.

Also, the normally open LB1 interlock switch 36 was closed with the LB1 switch and closed the circuit for the valve operating coil 37 of the air operating device 27, this circuit leading through the interlock switch 38 which is closed. It will be understood that the coil 37 operates a valve in the device 27 to control the admission of compressed air. When the coil 37 is energized the valve is operated to cause the device 27 to drive the contact device 26 toward the point b and gradually short circuit the resistance 19, the coil 37 corresponding in its functions to the coil 68 of my aforesaid patent. The air-operated device now starts operating to move the contact device 26 toward the point b thereby gradually short circuiting the resistance 19 and accelerating the motors.

Figure 4:
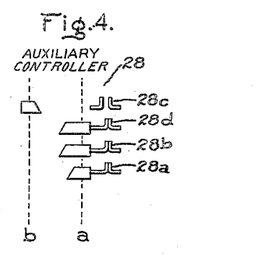
Fig. 4, a lay-out view of a controller driven by the hydraulic operating means.
Figures 5, 7:
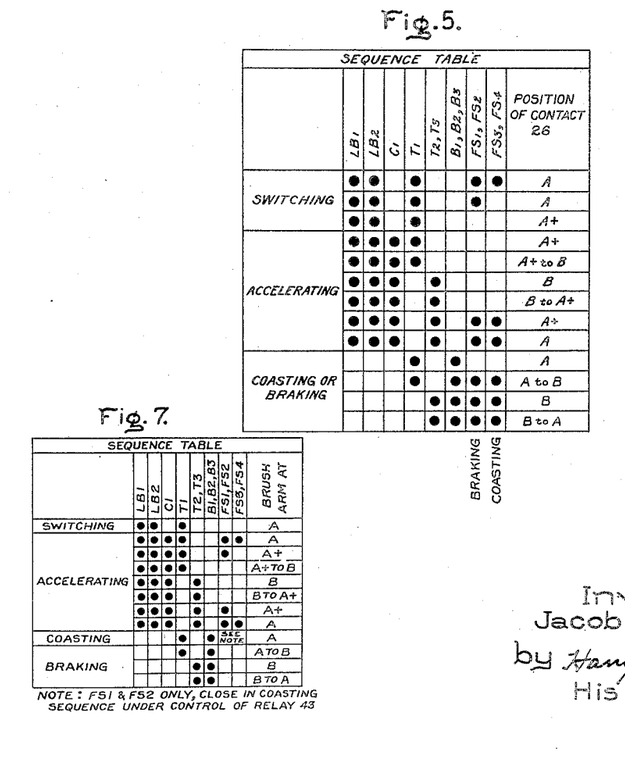
Fig. 5 is a sequence table of operation of the contactors.
Fig. 7 is a sequence table of operation of the contactors for the system of Fig. 6.

When the LB2 switch closes, it closes an interlock switch 39 thereby energizing the FS1 and FS2 coils in parallel with each other through the switch 28b on the controller 28 (Fig. 4). The FS1 and FS2 switches close and connect the entire values of the resistances 22, 22a and 23, 23a in parallel with their respective pairs of field windings for reduced field excitation.

It is contemplated that the acceleration controller 24 will be moved normally from the off to the second and last position in one continuous movement so that immediately after the switches 24a and 24b are closed, the acceleration controller switches 24c and 24d are closed.

The acceleration controller switch 24c closes the circuit for the coils FS3 and FS4 in parallel with each other whereby the switches FS3 and FS4 are closed. These switches short circuit portions of the resistances 22 and 23 for a still further reduced field excitation. The circuit for the FS3 and FS4 coils leads through the 24c switch, the 28a switch on the controller 28 which is closed, and the interlock switch 40 which is closed.

The acceleration controller switch 24d closes a circuit for the C1 coil which closes the C1 contactor thus connecting the resistance 18 in parallel with the resistance 20 for further acceleration of the motor.

Soon after the motor is energized, the hydraulic motor 27 turns auxiliary controller 28 to a position to open the switch 28a whereby the FS3 and FS4 coils are deenergized for increased field excitation. Very soon thereafter, the auxiliary controller switch 28b opens and deenergizes the FS1 and FS2 coils whereby their switches open. This removes the field shunts and gives full field excitation.

The device 27 continues to operate and short-circuit the resistance 19 and when it has short-circuited it and the contact 26 arrives at the point b, the switch 28c in the controller 28 is closed whereby the TS coil is energized and opens interlock switches 31 and 38, opens the T1 switch, closes the T2 switch and closes the T3 switch. The T1 switch deenergizes the resistance 18 while the T2 switch connects the resistance 19 again in the motor circuit. The T3 switch connects the resistance 20 to the resistance varying contact 26. The opening of the interlock switch 38 by the TS coil deenergizes the coil 37 whereby the device 27 reverses and moves the contact 26 back toward the point a. This causes the controller 28 to close the switch 28b thereby reclosing the FS1 and FS2 switches for reduced field excitation and soon thereafter close its 28a switch for reclosure of the FS3 and FS4 switches for the minimum field excitation during the completion of the acceleration to high speed. The TS coil remains energized through its interlock switch 41.

I have also provided a current responsive acceleration and deceleration relay 40 which controls the speed of the device 27 so as to maintain a predetermined maximum current in the motoring or braking circuit as the case may be. This relay is provided with a coil 35 responsive to the current in the motor circuit when the motors are exerting a driving effort, a coil 44 which as will be described in detail in connection with the dynamic braking operation is energized in response to the dynamic braking current, and a voltage coil 45 which acts on the common armature in the same sense as coils 35 and 44.

During motoring operation, the movable contact 46 of the relay 43 makes vibratory engagement with its lower contact, it being biased by gravity or by a suitable spring to its lower position shown. The relay thereby controls the energization of a coil 47 controlling an oil valve in the device 27 in the manner of the coil 80 of my aforesaid patent so as to control the speed of operation of the contact device 26 in each direction to establish and maintain a predetermined maximum motoring current. In my present device, however, the oil valve is normally closed to prevent operation of the device 27 and is opened by energization of the coil 47 to effect operation of the device 27.

When in its lower position indicated, the contact 46 closes a circuit through the conductor 48, the coil 45, the coil 47 and through either the now open C1 interlock switch 49, the now open LB1 interlock switch 50 or the controller 28 switch 28d to the ground wire 32. The switch 28d is closed when the controller 28 is in its starting position and for a short distance from its starting position. The coil 47 is therefore initially energized through 28d to start the device 27. The coil 45 when energized raises the contact arm 46 and opens the circuit of the two coils 45 and 47 whereupon the device 27 stops. However, the contact arm 46 returns immediately to its lowermost position in accordance with its bias unless it is held up by the current coil 35. Thus the contact arm 46 makes vibratory engagement with its lower contact, but without touching the upper contact, until a predetermined maximum current value is established. When the current is much less than the maximum value, the contact arm 46 when disengaged from the lower contact, returns at once into engagement with the lower contact so that the coil 47 is energized for a large part of the time and the device 27 advances the contact 26 at a high speed whereby increased current flow results. As the current increases, the coil 35 exerts an increased holding pull preventing the contact 46 from returning so quickly into engagement with the lower contact so that the device 27 operates at a slower net speed. Finally when the predetermined maximum current is reached, the coil 35 holds the arm 46 out of engagement with the lower contact. The coil 47 then is not energized and the device 27 is at rest.

If the manually operated controller 24 is turned no further than its first position, the opening of switch 28d when contact 26 is moved from position a prevents the further energization of 47 and, thereby, further operation of 27. As described above, movement of 24 to its second position causes switch C1 to operate. Interlock switch 49 now closed completes the circuit for coil 47 permitting 27 to resume operation.

*Coasting and spotting*

Whenever the acceleration controller 24 is thrown to its off-position for coasting, the braking controller 25 of course also being in its off-position, the spotting operation preparatory to dynamic braking automatically takes place. In this position of the acceleration controller, the switch 24e is closed whereby a circuit is established for the B coil which operates to close the B1, B2 and B3 braking switches. The circuit for the B coil is through the switch 24e, the LB1 interlock switch 50a which is closed, the LB2 interlock switch 51 which is closed, the B coil, the C1 interlock switch 52 which is closed to the ground wire 32.

The B2 switch closes a circuit connecting a storage battery 53 to the motor circuit so as to supply energization to the field windings to assure that the motors build up as generators. This field flashing circuit leads through the B2 switch principally through the field windings 16 and 17, the B3 switch, the resistor 21 and coil 35 to ground and through the ground to the other terminal of the battery 53. The field windings 14 and 15 connected in a parallel circuit may receive some energization, however. When the motors build up as generators the battery is recharged by the voltage drop across the resistance 21 as described and claimed in Patent No. 2,120,957 to John F. Tritle and Jacob W. McNairy, issued June 14, 1938.

A dynamic braking circuit is established by the closure of the switches B1 and B3, this circuit leading from the point 54 through the B1 switch, the T1 switch, the resistance 18, the resistance 19, the contact device 26, the resistance 21 and the B3 switch to the point 55. The two pairs of motors are thus connected in parallel with each other in this braking circuit.

This energization of the B coil also takes place when the control circuits are energized with the motors at rest and the controllers 24 and 25 in their off-positions. Preferably a manually operated switch 56 is included in the common supply circuit 29 for the control circuits which switch is closed just prior to manipulation of the acceleration controller 24 when the motors are started.

The B coil closes also its interlock switch 56a establishing a circuit for the coil 37 of the device 27 which starts to operate and drives the contact 26 toward the point b, the coil 47 being energized through the LB1 switch 50. This circuit for the coil 37 is from conductor 29 through switch 24e, switch 50a, switch 51, switch 56a, conductor 56b, switch 38 which is now closed and the coil 37 to the ground wire 32. It should be noted that these same connections are established when the manually operated switch 56 is closed with the motors at rest. Therefore, the device 27 starts operating to drive the contact 26.

At the beginning of this coasting operation, the switch 28d in the controller 28 is closed and closes the circuit for the oil coil 47 of the device 27 although this circuit is closed also through the LB1 switch 50. This circuit leads from the conductor 29 to the contact arm 46 in its lowermost position, coil 45, the coil 47 and the switch 28d or the switch 50 to the ground wire 32. The coil 45, however, energized with the coil 47 immediately picks up the contact 46 thus interrupting its own circuit and the circuit of the coil 47. The arm 46 then drops to its lowermost position to again energize the coils, this being repeated in a vibratory action and causing the device 27 to jog the contact arm 26 along. During this period the motors have full field excitation, that is, the fields are not shunted so that the full motor current passes through the field windings. It should be understood that this coasting current is limited as will now be explained to a low value which does not give appreciable braking action.

As the current in the dynamic braking circuit increases with building up of the motors as generators, the coil 44 which is responsive to this current finally throws the contact arm 46 to its upper position. This coil 44 is connected in a circuit leading from an intermediate point 57 on the resistor 21, conductor 58, resistors 59, 60, 61 and 62 and the coil 44 to ground. Thus the coil is connected by way of the ground connection through the current coil 35 in parallel with the right-hand porton of the resistor 21. The current coil 35 is energized at the present time only by the field flashing current from battery 53 and by the current flowing through the coil 44 the combination of which is not great enough to give it appreciable effective action.

If the resistance in the braking circuit when motoring is discontinued is sufficiently low to give the desired initial high coasting current, which may be approximately 50 amperes, the current limit relay 43 picks up immediately into engagement with its upper contact. When the upper contact is engaged, the FS3 and FS4 coils are thereby energized and close their switches to establish shunt circuits around the field windings for a low value of field excitation, preferably 52% of that field which would result from full armature current in the field windings. This circuit for the FS3 and FS4 coils leads from the conductor 29 through the contact arm 46 in its uppermost position, the FS4 switch 62a which is closed, the switch 25c of controller 25 which is closed, the B switch 62b which is closed, the FS3 and FS4 coils in parallel to the ground wire 32.

It should be noted that if the resistance in the braking circuit when motoring was discontinued is sufficiently low to give the desired coasting current as indicated by the picking up of the current limit relay 43, the FS3 and FS4 switches will be closed immediately and normal coasting current established.

The FS3 interlock swich 61a shorts the resistances 59 and 60 in the circuit of the coil 44. This reduces the operating point or current setting of the relay 43 relative to braking current. In other words, the coil 44 carries a larger amount of the current in the resistor 21 and is now responsive preferably to pick up the relay when the current in the dynamic braking circuit is, for example, 30 amperes which is the normal coasting current. In other words, the motor is momentarily built up to 50 amperes coasting current at full field and then the current limit relay 43 closes the FS3 and FS4 switches and short circuits are established calling for 30 amperes coasting current at 52% field. The FS4 interlock switch 63 establishes a holding circuit for coils FS3 and FS4 through the switch 51, switches 50a and 24e, to the supply conductor 29.

By thus establishing the final low coasting current by allowing the field flux to decrease in the motors from that corresponding to 50 amperes at full field to that corresponding to 30 amperes at weak field, overshooting of the control of the resistor in the dynamic braking circuit is prevented during this spotting operation.

It should be noted that during this coasting and spotting operation, the resistors are controlled by the device 27 in substantially the same manner as during motoring operation until the desired spotting current of 50 amperes initial and later 30 amperes is obtained. Thus, when the contact 26 has excluded the resistance 19, switch 28c is closed and a circuit established from conductor 56b through the TS coil whereby the T1 switch is opened, the T2 and T3 switches closed, and the switch 38 opened to deenergize the coil 37. The device 27 now operates in the opposite direction to still further reduce the resistance in the dynamic braking circuit as will be understood from the preceding description. The contact 26 may be driven when required at high speed such as from a to b and back again in 1½ seconds.

*Dynamic braking*

The spotting operation is carried out very quickly, probably within a few seconds after the acceleration controller 24 is returned to its off-position. It is contemplated that in most cases the spotting operation will be concluded before the braking controller 25 is operated to establish dynamic braking although at times when braking is applied immediately after the termination of motoring, the spotting may not be complete.

Operation of the braking controller 25 first opens its switches 25a, 25b and 25c and closes its switches 25d and 25g. The switches 25a and 25b open the circuits of the LB1 and LB2 coils to assure that these switches are not closed by operation of the acceleration controller 24. The 25c switch deenergizes the FS3 and FS4 coils and the FS3 and FS4 switches drop open thereby establishing momentarily full energization of the field windings. This full field energization is important in the event that braking is started immediately after the motoring operation is terminated and before the spotting has been completed. The build-up of the braking current with full field prevents overrunning of the device 27 and its contact 26. In fact, it will be observed that all braking cycles are established by momentarily providing full field to aid in the building up of the current in the dynamic braking circuit.

With the 25d switch closed, when the braking current is established and the current limit contact 46 is moved to its upper position, the FS1 and FS2 coils are energized whereby the FS1 and FS2 switches are closed to shunt the fields and give about 70% of full field energization for normal braking. The circuit for the FS1 and FS2 coils is from conductor 29 through the current limit relay contact 46, in its upper position, the 25d switch, the FS3 interlock switch 64, the coils in parallel, and the conductor 65 to the ground wire 32. A holding circuit is established around the relay contact 46 by the closing of the FS1 interlock switch 64a.

A circuit in parallel with the switch 24e is closed by the 25g switch to assure that the circuit of B is not opened by operation of 24.

The FS2 switch in closing opens its interlock switch 66 thereby inserting the resistance 62 in the circuit of the coil 44 which increases the operating point or current setting of relay 43 relative to backing current so that the full braking current with the 70% field may now be established. The operating point or current setting of relay 43 relative to braking current with the resistance 62 in the coil 44 circuit is low enough so that the dynamic braking torque with full field and the braking current required to operate the current limit relay is not greater than the subsequent torque with the 70% field strength and the increased current.

Before the current limit contact 46 is picked up, however, it is contemplated that the braking controller will have been moved to its final position in which it closes its switch 25e and opens its switch 25f. The switch 25e closes a circuit through the FS2 interlock switch 67, by-passing the contact 46, for the coil 45 and the coil 47 whereby the coil 47 is maintained energized and the device 27 now kept in continuous operation. Thus the device 27 operates to adjust the dynamic braking resistance independently of the current limit relay until FS2 is energized and opens its interlock switch 67 in this by-pass circuit. If the by-pass circuit is not used, a momentary hesitation of the controller 27 may occur at the instant the current limit relay picks up its contact 46 thereby opening the circuit of the coil 47. This hesitation is undesirable because it results in a decreased rate of build-up of the dynamic braking. With this circuit, the controller 27 advances continuously after braking is initiated until the weak field is established by the closure of the FS1 and FS2 contactors.

The braking controller switch 25f opens a shunt circuit around the resistance 59 thereby inserting this resistance in the circuit of the current coil 44 and still further raising the operating point of the relay relative to braking current. The resistance 59 is a ballast resistance having a large positive temperature coefficient. Preferably it has about 20 ohms resistance at room temperature and 180 ohms when hot. The result is that the resistance 59 heats and effects a gradual raising of the operating point of the relay relative to braking current, following the heating curve of the resistance 59. As a result, the device 27 advances step by step in a normal manner with the current limit contact 46 vibrating. On the other hand, if a 180 ohm resistor were inserted, the current limit relay would be held in its lowermost position and the KM controller operated at full speed, i. e., continuously until the current reached a value very near the desired braking value.

With the ballast resistor 59, the build-up is under full control of the current limit relay and over-travel of the device 27 is eliminated, even when the device 27 operates at a very high speed.

Preferably, the resistor 59 consists of one or more tungsten filaments in a gas-filled sealed envelope, the arrangement being similar to an electric lamp.

Another feature of the system is the interlock switch 30 in the circuit of the LB1 coil operating the main line contactor LB1. This switch 30 closes immediately upon the discontinuance of braking and provides for motoring immediately thereafter.

Figure 6:
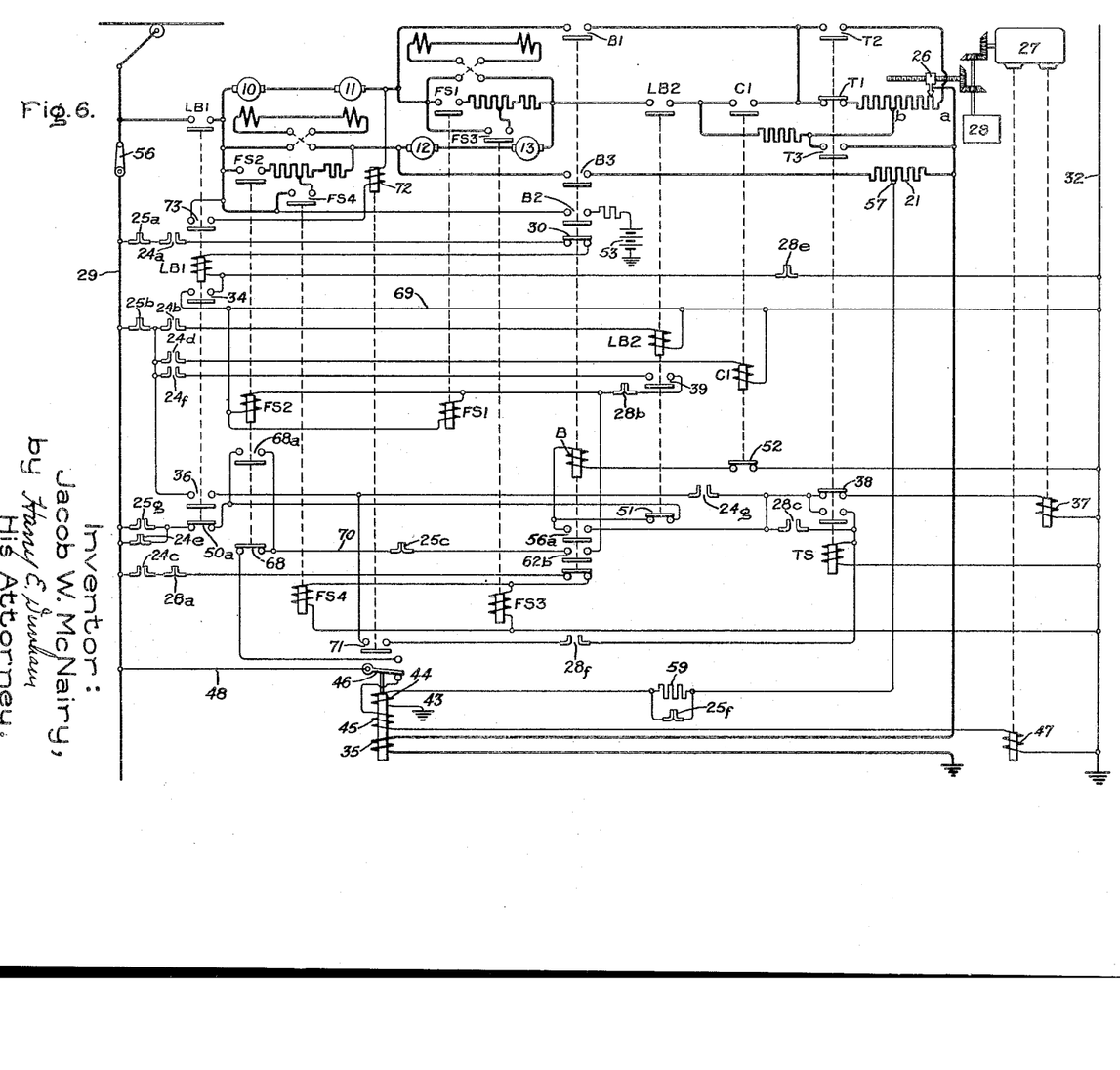

In Fig. 6 I have shown a modified form of my invention in which the coasting operation is carried out with full field to start and later the FS1 and FS2 switches are picked up for field shunting by the relay 43 in the event that the coasting current exceeds a predetermined value. When the braking operation is begun, the FS1 and FS2 switches are dropped out and dynamic braking is carried out with full field.

In Fig. 6 the acceleration controller 24 is provided with two additional switches 24f and 24g which are each operated by a segment on the controller identical with the segments that operate the switches 24c and 24d so that these two additional switches are operated at the same time that the switches 24c and 24d are operated. Also the controller 28 is provided with two additional switches, a switch 28e which is normally closed and which is operated by a segment identical with the one that operates switch 28d, and a switch 28f which is closed immediately after the switch 28b is opened. Switches 25d and 25e of the braking controller are not used in Fig. 6.

Moreover, certain other parts have been eliminated in Fig. 6 such as the resistances 60, 61 and 62, the LB1 switch 50, the FS2 switches 66 and 67, the TS switch 31 and the C1 switch 49. Two new FS2 switches 68 and 68a are provided.

Figure 1:
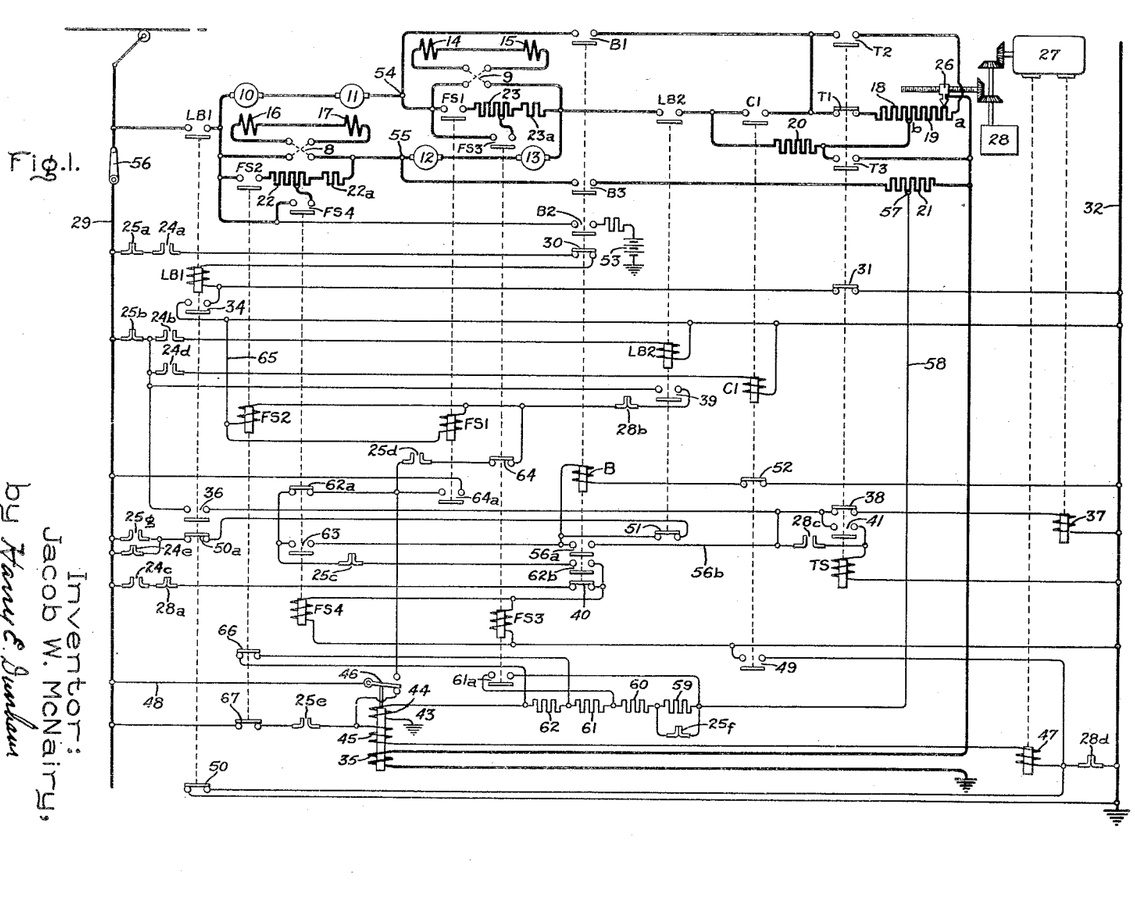

During acceleration, the motor is controlled by the acceleration controller 24 in the manner described in connection with Fig. 1 when the acceleration controller 24 is thrown immediately to its second position so that the two additional switches 24f and 24g are closed. If the controller 24 is stopped in the first position, these switches are not closed and consequently the FS1 and FS2 switches in whose circuit the 24f switch is connected are not closed. Furthermore, the failure of the 24g switch to be closed prevents energization of the coil 37 and therefore the operating device 27 is not started.

In Fig. 6 parts corresponding to the parts of Fig. 1 have corresponding reference characters and operate in the manner described in connection with Fig. 1 except as otherwise noted in the following description.

During the coasting and spotting operation with the modified form of Fig. 6, the switch 24e causes energization of the B coil which closes the B1, B2 and B3 dynamic braking switches. The motors then build up as generators and supply a small current having no appreciable braking effort to the dynamic braking circuit, and the device 27 starts to control the resistance in the braking circuit under the control of the relay 43. The current becomes high enough very soon to pick up the relay arm 46 so that it touches the upper contact and closes a circuit for the FS1 and FS2 coils which pick up their switches and close shunt circuits around the field windings. This circuit for the FS1 and FS2 coils leads from the conductor 29 through the conductor 48, contact arm 46, in its upper position, the FS2 switch 68 which is closed, the 25c switch, the B switch 62b which is closed to the two coils FS1 and FS2 in parallel to the conductor 69 and then to the ground wire 32. When the FS2 switch picks up, it closes its interlock switch 68a which closes a holding circuit around the FS2 switch 68 and the relay contact arm 46. This circuit leads from the conductor 29 through the 24e switch, the LB1 switch 50a and the FS2 switch 68a to the conductor 70.

In Fig. 6, when the braking controller 25 is moved to an operating position, its 25c switch opens and drops out the FS1 and FS2 switches whereby the field shunting is removed. This gives full field which in this system is used entirely during the dynamic braking operation. The 25c switch which remains open prevents energization of the FS1 and FS2 switches when the contact arm 46 engages its top contact.

The device 43 operates in the manner previously described to control the operation of the device 27 and thereby maintain a predetermined dynamic braking current. When the current reaches the predetermined maximum, the contact 46 is held in its uppermost position by the current coil 43.

Another feature of the system of Fig. 6 is the normally open relay switch 71 which is operated by a coil 72 in response to the voltage across the motors 10 and 11. The coil 72 is connected across the motors by the closure of the LB1 interlock switch 73 when the LB1 switch closes for motor operation. This voltage responsive relay 71 is provided to energize the TS coil and thereby shorten the acceleration sequence when power is reapplied after coasting while the car is running at a high speed. It will be understood that under such conditions the entire acceleration resistance is reinserted in the motor circuit and normal accelerating current through the motors is not attained until a part or all of the accelerating resistance has been cut out of the motor circuit by movement of the contact 26, from a to b and back to a if required. It will be understood however, that the contact 26 may be moved at high speed by the device 27. For example for high speed operation the contact 26 may move from a to b and back to a in one and one half seconds.

The coil 72 operates to close the relay switch 71 in response to a predetermined high voltage across the motor armatures 10 and 11 but after the switch 28f has closed, which is very soon after the contact arm 26 leaves the position a. Under these conditions, it will be observed that the switch 71 closes a circuit for the TS coil independently of the 28c switch and, consequently, the TS coil may be energized in response to motor voltage, which is a function of motor speed, before the contact arm 26 reaches the position b.

When the TS coil is energized the acceleration resistance is immediately reduced, as previously explained, and the TS interlock switch 38 opens and thereby opens the circuit of the coil 37 whereby the device 27 reverses and moves the contact arm 26 back toward the position a as for the second part of the acceleration sequence. As a result of this action normal accelerating current is provided in a shorter time than would be required if the complete acceleration sequence through contact 26 were used.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States, is:

1. In a control system for an electric vehicle, the combination of a motor having a field winding, a resistor, means for connecting said resistor across said motor with at least substantially full excitation of said field winding, and means responsive to the current in said resistor for adjusting the amount of said resistor connected across said motor until a predetermined current is obtained in said resistor and for controlling the excitation of said field winding.

2. In a control system for an electric vehicle, the combination of a motor having a field winding, a resistor, means for connecting said resistor across said motor with at least substantially full excitation of said field winding, and means responsive to the current in said resistor for adjusting the amount of said resistor connected across said motor until a predetermined current is obtained in said resistor and thereafter reducing the excitation of said field winding and changing the setting of said current responsive means for a lower current in said resistor.

3. In a control system for an electric vehicle, the combination of a motor having a series field winding, a dynamic braking resistor, means for connecting said resistor across said motor with full excitation of said field winding, means responsive to the current in said resistor for adjusting the amount of said resistor connected across said motor until a predetermined current is obtained in said resistor and thereafter partially disabling said field winding.

4. In a control system for an electric vehicle, the combination of a motor having a series field winding, a dynamic braking resistor, means for connecting said resistor across said motor with full excitation of said field winding, means responsive to the current in said resistor for adjusting the amount of said resistor connected across said motor until a predetermined current is obtained in said resistor and thereafter partially disabling said field winding and changing the setting of said current responsive means for a different current in said resistor.

5. In a control system for an electric vehicle, the combination of a motor having a field winding, a dynamic braking resistor, means for connecting said resistor across said motor with full excitation of said field winding, means responsive to the current in said resistor for adjusting the amount of said resistor connected across said motor until a predetermined current is obtained in said resistor and thereafter reducing the excitation of said field winding and changing the setting of said current responsive means for a lower current in said resistor, a braking controller movable to increase the excitation of said field winding to initiate effective braking, and to increase the current setting of said current responsive means, for thereafter reducing the excitation of said field winding and still further increasing the current setting of said current responsive means whereby said current responsive means adjusts said resistor to maintain a predetermined dynamic braking current.

6. In a control system for an electric vehicle, the combination of a motor having a field winding, a dynamic braking resistor, means for connecting said resistor across said motor with full excitation of said field winding, means responsive to the current in said resistor for adjusting the amount of said resistor connected across said motor until a predetermined current is obtained and thereafter partially disabling said field winding and decreasing the setting of said current responsive means for a lower current value in said resistor, a braking controller movable to restore a full operation of said field winding to initiate effective braking and to increase the current setting of said current responsive means, and means operated by said current responsive means for partially disabling said field winding upon the establishment of a predetermined initial low dynamic braking current in said resistor and for still further increasing the current setting of said current responsive means whereby said current responsive means adjusts said resistor to maintain a predetermined dynamic braking current.

7. In a control system for an electric vehicle, the combination of a motor having a field winding, a dynamic braking resistor, means for connecting said resistor across said motor with full excitation of said field winding, a ballast resistor having a large temperature coefficient of resistance, means responsive to the current in said resistor for adjusting the amount of said dynamic braking resistor connected across said motor until a predetermined current is obtained in said resistor and thereafter reducing the excitation of said field winding, and a braking controller movable to increase the excitation of said field winding to initiate effective dynamic braking operation and connect said ballast resistor in circuit with said current responsive means to vary gradually the current setting of said current responsive means.

8. In a control system for an electric vehicle, the combination of a motor having a field winding, a dynamic braking resistor, means for connecting said resistor across said motor with full excitation of said field winding, a ballast resistor having a positive temperature coefficient of resistance, means responsive to the current in said resistor for adjusting the amount of said resistor connected across said motor until a predetermined current is obtained in said resistor and thereafter reducing the excitation of said field winding and decreasing the setting of said current responsive means for a lower current value in said resistor, a braking controller movable to increase the excitation of said field winding to initiate effective braking and connect said ballast resistor in circuit with sad current responsive means to increase gradually the current setting of said current responsive means.

9. In a control system for an electric vehicle, the combination of a motor having a series field winding, a dynamic braking resistor, means for connecting said resistor across said motor with full excitation of said field winding, a ballast resistor having a positive temperature coefficient of resistance, means responsive to the current in said dynamic braking resistor for gradually adjusting the amount of said resistor connected across said motor until a predetermined current is obtained in said resistor and thereafter weakening the excitation of said field winding and decreasing the setting of said current responsive means for a lower current value in said dynamic braking resistor, a braking controller movable to restore full excitation of said field winding to initiate effective braking and to connect said ballast resistor in circuit with said current responsive means to increase gradually the current setting of said current responsive means, and means operated by said current responsive means for weakening the excitation of said field winding upon the establishment of a predetermined braking current in said resistor and for still further increasing the current setting of said current responsive means whereby said current responsive means adjusts said resistor to maintain a predetermined dynamic braking current.

10. In a control system for an electric vehicle, the combination of a driving motor having a series field winding, a resistor, control means for energizing said motor with said resistor in circuit therewith and for controlling said resistor to accelerate said motor, means responsive to movement of said control means to deenergize said motor for connecting said resistor across said motor to initiate braking generator operation of said motor, and means responsive to the current in said resistor for weakening the excitation of said field winding.

11. In a control system for an electric vehicle, the combination of a driving motor having a series field winding, a resistor, control means for energizing said motor with said resistor in circuit therewith and for controlling said resistor to accelerate said motor, means responsive to movement of said control means to deenergize said motor for connecting said resistor across said motor to initiate braking generator operation of said motor, and means responsive to the current in said resistor for adjusting the amount of said resistor in the circuit of said motor and for weakening the excitation of said field winding.

12. In a control system for an electric vehicle, the combination of a driving motor having a series field winding, a resistor, means for energizing said motor with said resistor in circuit therewith and for controlling said resistor to accelerate said motor, means operated by movement of said control means to deenergize said motor for connecting said resistor across said motor to initiate braking generator operation of said motor, means responsive to the current in said resistor for adjusting said resistor and for weakening the excitation of said field winding, upon the establishment of a predetermined current in said resistor, and control means movable to restore full excitation of said field winding to initiate dynamic braking.

13. In a control system for an electric vehicle, the combination of a driving motor having a series field winding, a resistor, means for energizing said motor with said resistor in circuit therewith and for controlling said resistor to accelerate said motor, means operated by movement of said control means to deenergize said motor for connecting said resistor across said motor to initiate braking generator operation of said motor, means responsive to the current in said resistor for adjusting said resistor and for weakening the excitation of said field winding, upon the establishment of a predetermined current in said resistor, control means movable to restore full excitation of said field winding to initiate dynamic braking, and means operated by said current responsive means for weakening the excitation of said field winding and for still further increasing the setting of said current responsive means.

14. In a control system for an electric vehicle, the combination of a driving motor having a series field winding, a resistor, means for energizing said motor with said resistor in circuit therewith and for controlling said resistor to accelerate said motor, means responsive to deenergization of said motor for connecting said resistor across said motor with full motor field excitation to initiate braking generator operation of said motor, means responsive to the current in said resistor for adjusting the amount of said resistor in the circuit of said motor, for shunting said field winding to give a low value of field excitation upon the establishment of a predetermined current in said resistor and for changing the setting of said current responsive means to hold thereafter a lower current, a controller means movable to unshunt said field winding to initiate effective braking, means operated by said current responsive means for shunting said field winding upon the establishment of a predetermined braking current to give a predetermined low field excitation and for still further increasing the setting of said current responsive means to maintain a predetermined dynamic braking current.

15. In a control system for an electric vehicle, the combination of a driving motor having a series field winding, a resistor, an acceleration controller movable to energize said motor with said resistor in circuit therewith, means responsive to the current in said motor for controlling said resistor to accelerate said motor, means responsive to movement of said acceleration controller to deenergize said motor for connecting said resistor across said motor with full motor field excitation to initiate braking generator operation of said motor, braking current responsive means for adjusting the amount of said resistor in the circuit of said motor, for shunting said field winding to give a low value of field excitation upon the establishment of a predetermined current in said resistor and for changing the setting of said braking current responsive means to hold thereafter a lower current, a braking controller movable to unshunt said field winding and increase the current setting of said braking current responsive means for initiating effective braking, means operated by said braking current responsive means for shunting said field winding upon the establishment of a predetermined braking current to give a predetermined low dynamic braking field excitation and for still further increasing the setting of said current responsive means to maintain a predetermined dynamic braking current.

16. The combination with a motor of a starting resistance therefor, switching means for energizing said motor with said resistance in circuit therewith, control means for excluding said resistance from the circuit of said motor to accelerate said motor, means independent of said control means responsive to the speed of said motor for excluding said resistance from the circuit of said motor independently of said control means, and means operated by said switching means for controlling the operation of said speed responsive means.

17. The combination with a motor, of a starting resistance therefor, switching means for energizing said motor with said resistance in circuit therewith, control means for excluding said resistance from the circuit of said motor to accelerate said motor, means for connecting said resistance across said motor for dynamic braking operation after said motor is deenergized, means responsive to the voltage across said motor for operating said control means to exclude said resistance from the circuit of said motor, and means operated by said switching means for controlling the operation of said voltage responsive means.

18. In a control system for an electric vehicle, the combination of a motor, a braking resistance, switching means for connecting said resistance across said motor for dynamic braking operation, a second switching means for energizing said motor with said resistance in circuit therewith for motoring operation, and motor speed responsive means rendered effective by the operation of said second switching means for excluding at least a portion of said resistance from the circuit of said motor when said motor is reenergized while operating at a speed greater than a predetermined speed.

19. In a control system for an electric vehicle, the combination of a motor, a braking resistance, control means for connecting said resistance in circuit with said motor for dynamic braking operation, means responsive to the current in said motor for adjusting the amount of said resistance connected in said braking circuit, switching means for energizing said motor with said resistance in circuit therewith for motoring operation, and motor voltage responsive means rendered effective by the operation of said switching means to energize said motor for operating said resistance adjusting means to exclude at least a portion of said resistance from the circuit of said motor when said motor is reenergized while running at a speed greater than a predetermined speed.

JACOB W. McNAIRY.